United States Patent [19]

Randin

[11] 4,296,016

[45] Oct. 20, 1981

[54] METHOD OF PREPARING A POLYMERIC ELECTROLYTE PARTICULARLY FOR AN ELECTRO-OPTICAL DEVICE

[75] Inventor: Jean-Paul Randin, Neuchâtel, Switzerland

[73] Assignee: Ebauches S.A., Neuchatel, Switzerland

[21] Appl. No.: 136,466

[22] Filed: Apr. 2, 1980

[30] Foreign Application Priority Data

May 3, 1979 [CH] Switzerland .......................... 133/79

[51] Int. Cl.$^3$ ............................................... C08K 3/00
[52] U.S. Cl. .............................. 260/29.6 SQ; 526/287
[58] Field of Search ................. 526/287; 260/29.6 SQ

[56] References Cited

U.S. PATENT DOCUMENTS 2,983,712  5/1961  Wilkinson ............................ 526/287
3,402,222  9/1968  Zutty ................................... 526/287
3,692,673  9/1972  Hoke .................................... 526/287
3,931,089  1/1976  Karl .............................. 260/29.6 SQ

*Primary Examiner*—Paul R. Michl
*Attorney, Agent, or Firm*—Young & Thompson

[57] ABSTRACT

In preparing an electrolyte comprising a mixture of poly[2-acrylamido-2-methyl-propanesulfphonic acid] and water in which a pigment is distributed substantially homogeneously, monomer of the formula $CH_2=CH-CO-NH-C(CH_3)_2-CH_2-SO_3H$ is first dissolved in water with a pigment suspended in it. A polymerization initiator, such as 2,2′-azo-bisisobutyronitrile, is added to the mixture and the polymerization reaction is carried out with agitation, at a temperature in the range from room temperature to 60° C. Finally, part of the water is evaporated from the viscous mass obtained, to give the desired mix. The pigmented electrolyte may be used in electro-optical devices such as electrochromic display cells.

5 Claims, No Drawings

METHOD OF PREPARING A POLYMERIC ELECTROLYTE PARTICULARLY FOR AN ELECTRO-OPTICAL DEVICE

The invention relates to the preparation of a polymeric electrolyte for providing the ionic conduction between an electrode and a counter electrode in an electro-optical device, particularly an electrochromic display cell.

It is generally accepted that an electrolyte of this type must have certain properties if it is to be used satisfactorily in an electrochromic display cell of the type described particularly in U.S. Pat. No. 4,116,546, where there is an electrochromic layer on both the electrode and the counter electrode, or in Swiss Pat. No. 594,263, where no electrochromic layer is used on the counter electrode. These display cells use an oxide of a transition metal, such as tungsten trioxide ($WO_3$), as the electrochromic layer. The electrode known as the display electrode is in the form of conductive segments which can be selectively controlled to display, for example, symbols, numbers or letters. The electrolyte must be a good ionic conductor but with low electronic conductivity, must be chemically and electrochemically stable, and must be compatible with the materials making up the electrode and counter electrode. More particularly, it must be inert relative to the electrochromic layer, must be pigmentable in order to form a diffusing opaque background that will contrast with the electrochromic layer and conceal the counter electrode, and must have a consistency appropriate to give uniform physical contact with both the electrode and the counter electrode.

The electrolyte used in the first known electrochromic devices generally consisted of concentrated sulphuric acid or other acids in liquid or gel form, e.g. mixed with glycerin; this has serious disadvantages due to the gradual dissolution by the electrolyte of the electrochromic layer of $WO_3$. In addition, the use of a liquid electrolyte often created problems of sealing the electrochromic cell. The use of aprotic solvents with e.g. lithium perchlorate dissolved in them creates great technological difficulties during the preparation of the electrolyte and the formation of the cell.

An important improvement in the properties of these electrolytes has been provided with the use of ionic polymers, as described in the abovementioned Swiss Pat. No. 594,263. The polymers are in solid or paste form and are preferably of the type which can be used as ion exchangers such as polystyrene sulphonic acid, polyacrylic acid, polymethacrylic acid and phenolsulphonic acid. Polymers that have subsequently been recommended by other authors for use as the electrolyte are a perfluorosulphonic acid resin, described particularly in French Pat. No. 2,274,940 and U.S. Pat. No. 4,116,546, or a polyethylene sulphonic acid as disclosed in U.S. Pat. No. 4,116,545.

In the course of research on other proton polymers that can be used as electrolytes in electro-optical devices, it has been found that poly[2-acrylamido-2-methyl-propanesulphonic acid] has all the properties required for the proton polymeric electrolyte preparation, particularly for electro-optical devices: it has the abovementioned features of appropriate stability, conductivity, inertia relative to electrochromic materials and physical consistency. This electrolyte, which thus consists of a mixture of poly[2-acrylamido-2-methyl-propanesulphonic acid] and water, is mentioned particularly in Swiss patent application No. 4132/79 filed on May 3, 1979.

When the above electrolyte is intended for a transparent or reflecting electrochromic device, it is used as it is. On the other hand, when it is intended for an electrochromic device with a diffusing opaque background contrasting with the electrochromic layer and concealing the counter electrode, the electrolyte also contains a pigment, distributed substantially homogeneously. The pigment may be, for example, $TiO_2$ or a mixture of $TiO_2$ and other oxides, and is generally present in quantities of 2 to 25% by weight of the polymer.

The water content of the electrolyte is preferably less than about 52% of the weight of dry polymer, as described in the abovementioned Swiss patent.

The poly[2-acrylamido-2-methyl-propanesulphonic acid], which can be obtained by polymerising the monomer by known methods of vinyl polymerisation, is in highly viscous form, particularly if water was used as the solvent during polymerisation. Water is the preferred solvent in the preparation of an electrolyte for electrochromic cells, since a certain quantity of water is necessary to produce ionic conduction in the electrolyte. Moreover, the use of a solvent other than water would necessitate eliminating the solvent completely, then adding water.

The subsequent operation of dispersing the pigment in the viscous mass of the polymer is thus difficult, and a large quantity of pigment is required to give the electrolyte the required diffusing power and opacity. Dispersion is usually effected by using a ball mill or other means; this has practical disadvantages and does not give an altogether homogeneous dispersion.

The present invention provides a method of preparing a proton polymeric electrolyte, particularly, for an electrooptical device, comprising a mixture of poly[2-acrylamido-2-methyl-propanesulphonic acid] and water and containing a pigment distributed substantially homogenously, in which the pigment is suspended in water, the monomer of the formula

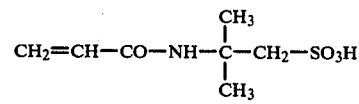

or a salt thereof is dissolved in the suspension, a polymerisation initiator is added to the mixture obtained, the polymerisation reaction is carried out with agitation, and part of the water is evaporated until the desired mix is obtained. The polymerisation temperature is usually in the range from room temperature to 60° C.

The starting monomer, 2-acrylamido-2-methyl-propanesulphonic acid, is a white crystalline solid with a melting point of 185° C. (with decomposition), which is over 100% by weight soluble in water and dimethylformamide and 5 to 20% soluble in alcohols. It is commercially available particularly under the registered trade mark "AMPS". The quantity of monomer dissolved in the pigmented suspension is preferably from 5 to 50% by weight.

In some cases, depending on the applications envisaged for the product obtained, the monomer may be used for polymerisation in the form of one of its salts, e.g. the sodium salt.

The preferred solvent for preparing the pigmented polymer is water, since the electrolyte obtained with this polymer must in any case contain a certain quantity of it in order to provide ionic conduction, and it is therefore useless to remove the polymerisation solvent completely.

The pigment is suspended in the selected solvent during the initial stage of the process according to the invention, in a quantity corresponding to 2 to 25% by weight relative to the weight of the desired polymer in the dry state. The pigment is selected from those normally used in electrolytes for electrochromic arrangements. Such pigments must form a diffusing opaque background, contrasting with the display electrode and concealing the counter electrode. As already noted, titanium dioxide ($TiO_2$) is the most commonly used, either alone or mixed with other oxides.

The initiator for the polymerisation reaction is selected from those currently used in vinyl polymerisation, e.g. water-soluble initiators such as ammonium persulphate and hydrogen peroxide, and water-soluble redox systems. An example of an initiator that has given good results in polymerising 2-acrylamido-2-methyl-propanesulphonic acid is 2,2'-azobisisobutyronitrile, which is marketed under the trade mark "VAZO".

The reaction mixture is preferably purged with an inert gas such as nitrogen or argon, at least during the stage when the monomer is being dissolved in the solvent with the pigment suspended in it. The passage of the inert gas may be continued after the initiator has been added, but in any case the polymerisation reaction must always be accompanied by agitation to ensure that the pigment is properly dispersed. The duration of the polymerisation reaction may vary from a few minutes to several hours, depending on the monomer concentration chosen, the reaction temperature, and the nature and concentration of the initiator or initiators.

Finally, part of the water is evaporated, e.g. in air or a nitrogen atmosphere, so that the electrolyte obtained has the desired water content, which is preferably under 52% by weight, as mentioned previously.

The method of the invention and the use of the resultant electrolyte for the manufacture of an electrochromic display cell will now be illustrated in greater detail with reference to the following example.

EXAMPLE 1.6 g of pigment, e.g. $TiO_2$, is added to 66.7 g of water, and the mixture is left in a ball mill overnight to obtain a homogeneous suspension. 10 g of 2-acrylamido-2-methyl-propanesulphonic acid monomer is then dissolved in the aqueous suspension, the mixture being heated to about 50° C. and purged by bubbling gaseous nitrogen therethrough. When the temperature has stabilised, 0.04 g of 2,2'-azo-bisisobutyronitrile ("VAZO") is added as a polymerisation initiator, the agitation and the bubbling of nitrogen being continued to keep the mixture in an inert atmosphere. After about 16 hours the polymerisation reaction is over.

To make an electrochromic display cell one can then proceed as follows: a transparent conductive layer (e.g. $SnO_2$) is applied to a transparent non-conductive substrate such as a glass slide. An electrochromic layer (e.g. $WO_3$) is deposited on the conductive layer and may be in the shape of a number, letter or any other symbol, to form a first electrode described as the display electrode. A second or counter electrode is formed e.g. by an electrochromic layer of $WO_3$ that has previously been polarised cathodically in a 10% solution of $H_2SO_4$. This strongly coloured counter electrode is washed and dried before being used in the cell. In a modified embodiment the counter electrode may consist of a sheet of paper graphite prepared from polymer fibres and carbon by methods known in the field of fuel cells.

The viscous aqueous mass of polymer obtained as described above, which contains about 15% of polymer, is applied directly to the counter electrode or to the display electrode, then the water is evaporated until a pasty consistency is obtained. The electrode with the electrolyte is then placed in an atmosphere with a relative humidity of 70 to 80% for at least 24 hours, to equilibrate the electrolyte and bring its water content to about 50% of the weight of dry polymer. The other electrode is finally applied to the resultant pasty electrolyte and the cell is appropriately sealed.

The cell made in this way with the electrolyte obtained by the method of the invention has been tested at room temperature and found to respond well to the various requirements made of it with a view to practical use as an electrochromic display arrangement. Thus poly[2-acrylamido-2-methyl-propanesulphonic acid] does indeed have properties appropriate for use as an electrolyte in electro-optical devices, that is to say, the above mentioned properties include conduction, physical consistency, stability and pigmentability.

Furthermore, the method of preparing this electrolyte so that it contains pigment distributed substantially homogeneously has in particular the following advantages compared with the known method used for dispersing a pigment in the viscous mass of a polymer, i.e. after the polymerisation reaction:

(a) it is quicker and, as water is used as the solvent, it eliminates the need to remove the polymerisation solvent;

(b) it results in a far more homogeneous and uniform dispersion of the pigment, which is very important when the polymer is to be used as the electrolyte in electrochromic devices; and (c) it results in economy with the pigment, which is used more effectively in smaller quantities.

While the invention has been described in detail and with reference to specific embodiments thereof, it will be apparent to one skilled in the art that various changes and modifications can be made therein without departing from the spirit and scope thereof.

The embodiments of the invention in which an exclusive property or privilege is claimed are defined as follows:

1. A method of preparing a proton polymeric electrolyte, particularly for an electro-optical device, which is a mixture of poly[2-acrylamido-methylpropanesulphonic acid] and water and containing pigment distributed substantially homogeneously, comprising forming a suspension of a said pigment in water, dissolving 5 to 50% by weight of a monomer of the formula

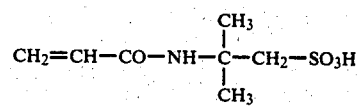

or a salt thereof in the suspension, adding a polymerisation initiator to the mixture, carrying out the polymerisation reaction with agitation, and evaporating part of the water until the water content is less than 52% of the weight of the dry polymer, the pigment being present in the amount of 2 to 25% by weight of the dry polymer.

2. A method as claimed in claim 1 in which the temperature for the polymerisation reaction is in the range from room temperature to 60° C.

3. A method as claimed in claim 1 in which the polymerisation initiator is 2,2'-azobisisobutyronitrile.

4. A method as claimed in claim 1 in which the mix is purged with an inert gas, at least during the stage when the monomer is being dissolved in the suspension.

5. A method as claimed in claim 1 in which said pigment is titanium dioxide.

* * * * *